United States Patent
Madan et al.

(10) Patent No.: US 12,105,595 B2
(45) Date of Patent: Oct. 1, 2024

(54) FILE IMMUTABILITY USING A DEDUPLICATION FILE SYSTEM IN A PUBLIC CLOUD USING NEW FILESYSTEM REDIRECTION

(71) Applicant: Dell Products L.P., Round Rock, TX (US)

(72) Inventors: Nitin Madan, Cupertino, CA (US); Bhimsen Bhanjois, Fremont, CA (US); Fei Wang, Sunnyvale, CA (US); Jagannathdas Rath, Bangalore (IN); Srisailendra Yallapragada, Cupertino, CA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/955,125

(22) Filed: Sep. 28, 2022

(65) Prior Publication Data

US 2024/0103978 A1 Mar. 28, 2024

(51) Int. Cl.
| | |
|---|---|
| G06F 16/00 | (2019.01) |
| G06F 11/14 | (2006.01) |
| G06F 16/11 | (2019.01) |
| G06F 16/16 | (2019.01) |
| G06F 16/174 | (2019.01) |
| G06F 16/176 | (2019.01) |

(52) U.S. Cl.
CPC ........ *G06F 11/1453* (2013.01); *G06F 16/119* (2019.01); *G06F 16/125* (2019.01); *G06F 16/162* (2019.01); *G06F 16/1748* (2019.01); *G06F 16/1774* (2019.01); *G06F 2201/84* (2013.01)

(58) Field of Classification Search
CPC .. G06F 11/1453; G06F 16/119; G06F 16/125; G06F 16/162; G06F 16/1748; G06F 16/1774; G06F 2201/84
See application file for complete search history.

(56) References Cited

U.S. PATENT DOCUMENTS

| | | | | |
|---|---|---|---|---|
| 7,529,784 B2 * | 5/2009 | Kavuri | ................. | G06F 16/122 |
| 2022/0121529 A1 * | 4/2022 | Rath | ..................... | G06F 16/174 |

\* cited by examiner

*Primary Examiner* — Paul Kim
(74) *Attorney, Agent, or Firm* — Staniford Tomita LLP

(57) ABSTRACT

Embodiments for providing file immutability for cloud storage data in a deduplicating filesystem and using a new filesystem that is spawned to receive redirected live data, after which the old filesystem is expired. Data objects are stored in the cloud by defining a protection duration from a first date to a fixed future date, and applying a retention lock to one or more data objects stored in cloud storage during the protection duration, the retention lock preventing unauthorized deletion, modification or movement of the data. A renew threshold date is defined within the protection duration, and a new filesystem is spawned on this date. All new data is redirected to the new filesystem and locked for the protection duration, and the first file system is destroyed.

15 Claims, 9 Drawing Sheets

FILE IMMUTABILITY USING A DEDUPLICATION FILE SYSTEM IN A PUBLIC CLOUD USING NEW FILESYSTEM REDIRECTION

CROSS-REFERENCE TO RELATED APPLICATIONS

The present application is related to the following U.S. patent application Ser. No. 17/865,378 filed on Jul. 14, 2022 and entitled "File Immutability Using a Deduplication File System in a Public Cloud," Ser. No. 17/955,376, filed on Sep. 28, 2022 and entitled "File Immutability Using a Deduplication File System in a Public Cloud using Selection Duration," and Ser. No. 17/955,405, filed on Sep. 28, 2022 and entitled "File Immutability Using a Deduplication File System in a Public Cloud using Selection Criteria," which are each assigned to the assignee of the present application.

TECHNICAL FIELD

Embodiments relate generally to cloud-based object storage, and more specifically to providing file immutability using a deduplication filesystem in a public cloud network.

BACKGROUND OF THE INVENTION

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data.

The rule SEC 17 a-4 (f) of the U.S. Security and Exchange Commission (SEC) stipulates stringent requirements for regulated entities that elect to retain data on electronic storage media. Records stored must be tamper-proof with no ability to alter or delete them until after the designated retention period. In a filesystem parlance, the SEC rule demands file immutability. A file that has been locked with a retention lock must be immutable till its expiry. In other words, the filesystem must prevent the locked files from being overwritten, erased, or otherwise altered. This requirement is relatively simple to achieve on physical (on-premises) filesystems. The filesystem namespace locks the file for the retention period. However, in the public cloud, this is task is much harder.

Cloud providers usually provide application program interfaces (APIs) to lock an object with retention time. Some applications and filesystems lock data blocks corresponding to the locked files and thus provide retention. For a deduplication filesystem, however, referenced data blocks are spread across the deduplication storage domain. The algorithm to map and lock data blocks becomes a much harder problem. The second problem is space optimization. Unless the filesystem writes deduplicated block sized objects (typically 8 KB) and maintain reference counts on them, there is no way to extend the object lock to just the last file's retention period.

What is needed, therefore, is a system and method to achieve the immutability objective in a deduplicating filesystem to overcome the inefficiencies in present systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
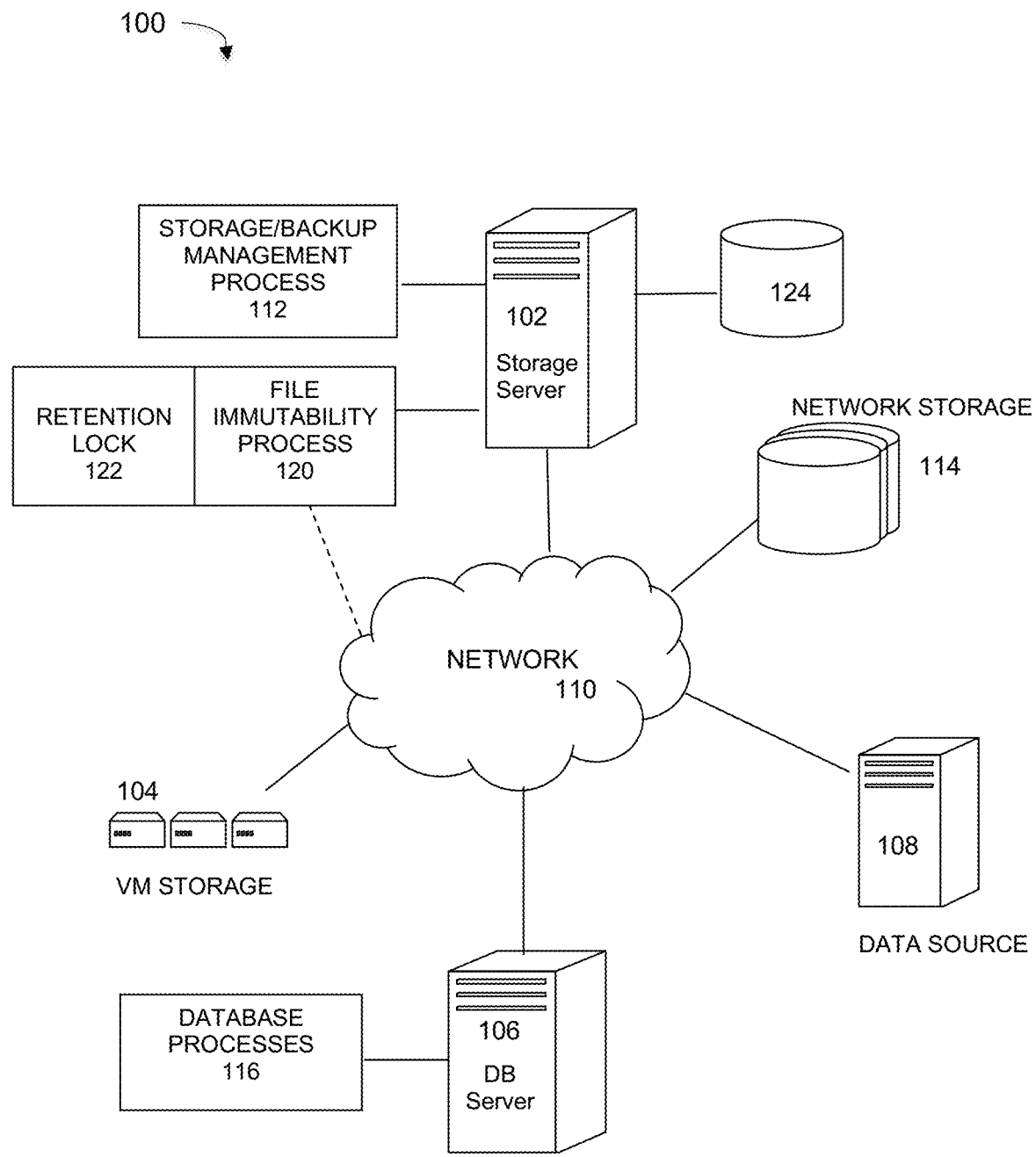
FIG. 1 is a diagram of a computing network implementing a system and method to file immutability for cloud storage data in a deduplicating filesystem, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a system and method to provide file immutability for cloud storage data in a deduplicating filesystem and using a new filesystem that is spawned to receive redirected live data, after which the old filesystem is expired.

FIG. 1 illustrates a computer network system that implements one or more embodiments of a data processing and storage network system implementing such a process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by DellEMC Corporation. However, other similar backup and storage systems are also possible.

The Data Domain File System (DDFS) from DellEMC is an example deduplication filesystem in which the filesystem anchors and segments data as it is ingested. The filesystem keeps track of segments which are stored on the disk, and if the segments are referenced again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
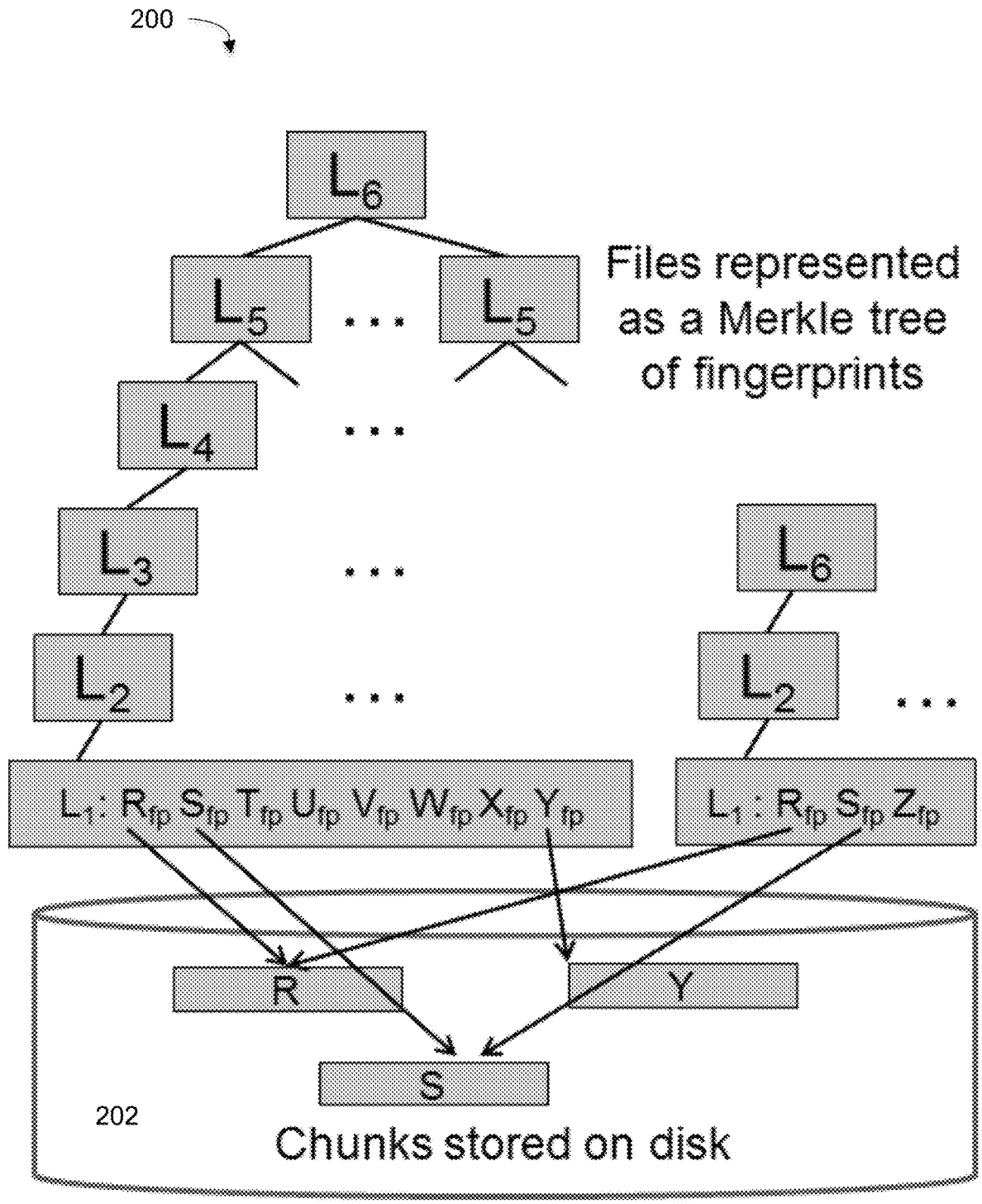
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as Lp chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical LP chunks. As this operation involves only the root of the tree, it is trivially fast and does not increase physical space in use beyond the one chunk containing the $L_6$.

Figure 3:
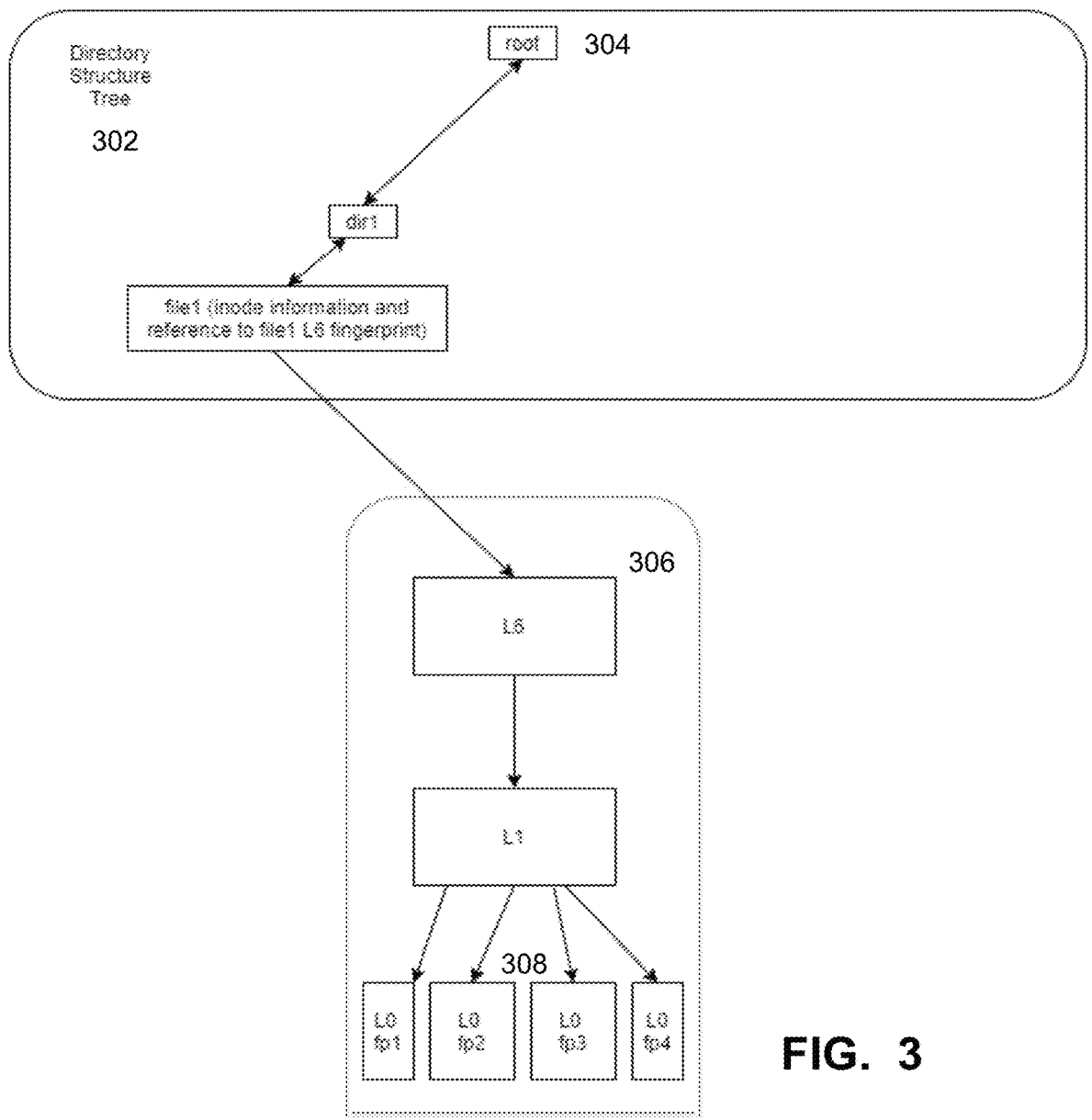
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree, and which hold the respective data for the corresponding fingerprints (fp1 to fpn). Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as Lp chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level. It should be noted that the L1 segment holds the fingerprints (or references) to the L0 segments (which have the actual data). The process to read a particular segment involves lookup of the fingerprint using the index hash table.

Figure 4:
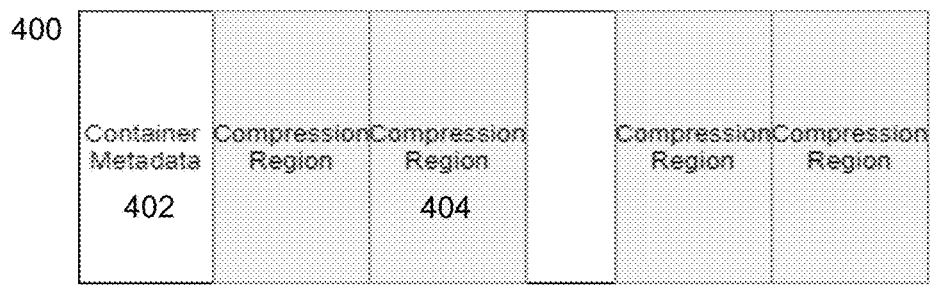
FIG. 4 illustrates a container comprising container metadata and a number of compression regions, under some embodiments.

Data segments are stored in containers, and the containers by themselves are formed by compression regions. FIG. 4 illustrates a container 400 comprising container metadata 402 and a number of compression regions 404.

Figure 5:
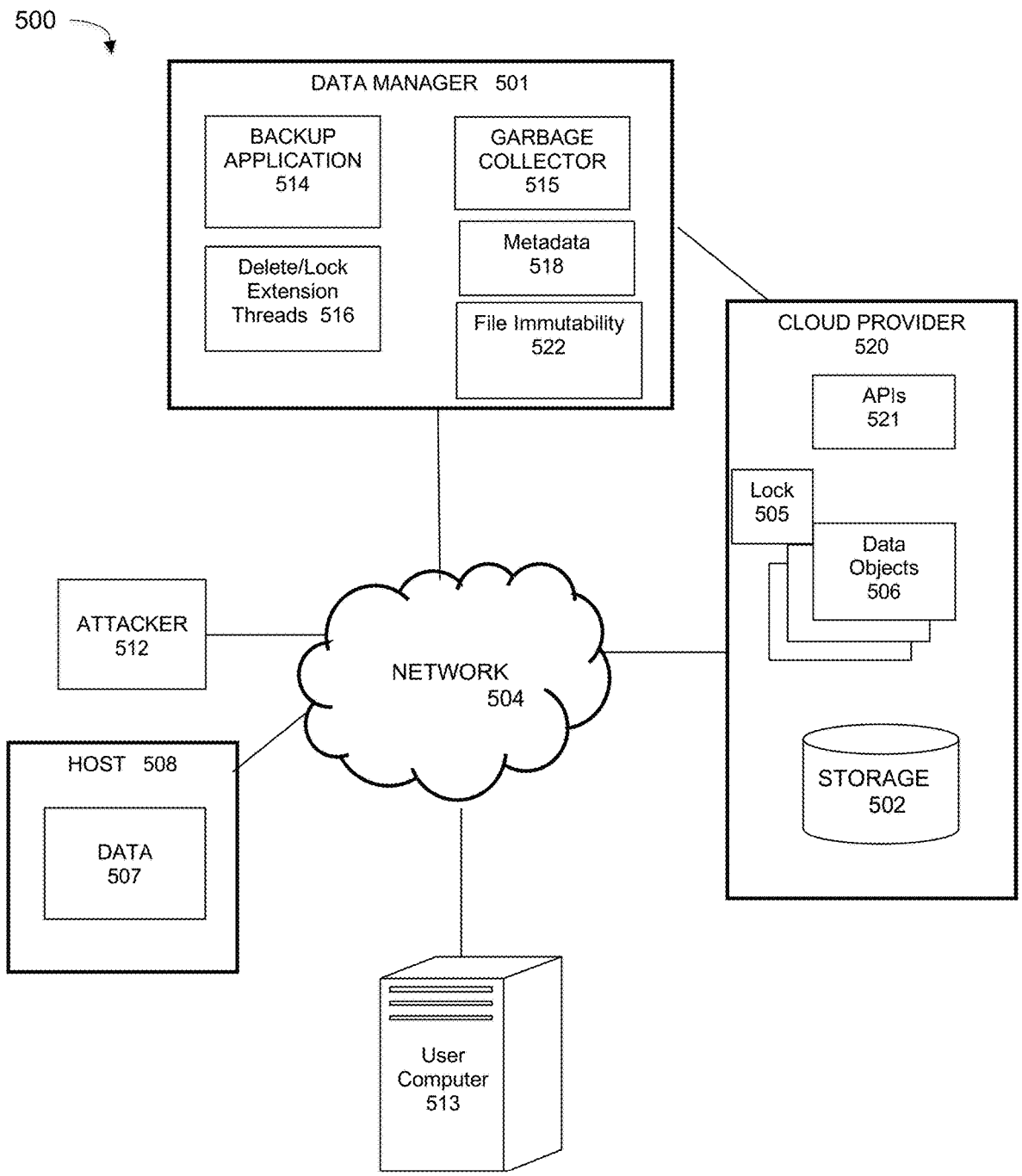
FIG. 5 illustrates a backup system including a file immutability process, under some embodiments.

Each file is described as a stream of fingerprint references. These fingerprints point to segments that can reside anywhere in the container-set (the deduplication domain). As shown in FIG. 5, segments are packed in regions and containers, which are represented as objects in the active tier or local tier (on-premises). In present systems, the segment sizes generally vary between 4 KB to 64 KB and the container object sizes vary between 1 MB to 4 MB and sometimes up to 8 MB or 16 MB depending on the filesystem's design.

With the increased adoption of cloud storage, deduplication applications have started supporting movement of deduplicated container objects to the cloud for long term retention (LTR). The data/objects are moved by the dedupe application based on various policies and configuration. Data movement policies usually specify the data to be moved, the source and target, and the movement criteria, such as file age, type, location, or other parameter. For example, a data movement policy can say: "move all active tier data older than 2 weeks to the cloud." In some cases, cloud native deduplication systems are also widely used, and their active tier/local tier is the cloud bucket itself instead of local disks or block devices. In this case, the deduplication container objects will also reside in the cloud buckets.

Retention locking is a functionality that is used on many backup systems, such as Data Domain Restorers (DDRs) to prevent modification or deletion of certain sets of files for a predetermined period (lock period). That is, retention locked files are set as read-only files until their retention expires, at which point they are set to read/write to allow modification and/or deletion. Retention locks are usually provided in two types: (1) governance and (2) compliance. Governance is generally less strict and locks against files can be reverted if necessary. Compliance is stricter and adhere to regulatory standards so that locks against files cannot be reverted. The system must be configured with a 'security officer' user who must authenticate certain commands.

For a file stored on-premises (locally to a server), retention locking is relatively simple and involves protecting the file from filesystem operations like overwrites, appends, and deletions. Here, the namespace can have numerous files with different retention lock durations, while sharing the same segments. As the underlying deduplicated objects are not exposed outside by any means, they are protected from deletions and modifications.

For files stored in the cloud, however, retention locking is more problematic. Cloud-based backup systems manage storage of data that is packed in objects in cloud-based storage (managed by a cloud-based provider/host). These objects, also referred to as data objects or cloud objects, carry user data safe storage. The cloud-based provider that hosts the cloud-based storage can support object locks and legal holds, such as regulatory holds that comply with SEC 14 a-f standards, and other similar standards.

Retention Lock in the Cloud

Cloud providers usually provide application program interfaces (APIs) to support object locks and legal holds. These APIs drive the underlying functionality, where the cloud resident objects are locked down for a certain time period. The legal hold API can lock the objects indefinitely (till the legal hold is removed). This would prevent deletions from cloud storage console. These APIs are used for locking objects for supporting immutability or retention lock compliance per SEC 17 a-4(f) standards, and one challenge is to provide retention lock with a deduplicating filesystem.

As mentioned above, it is difficult to protect the deduplicated objects in cloud. The segments are shared across numerous files, each serving a different retention duration due to the multitude of files in the filesystem namespace. Extending the filesystem level retention policy of each file to the corresponding segments and objects requires complex referencing and retention management systems at the segment level as well as the object level. This would require locking an object for the maximum amount of time of all retention durations of all files sharing segments within an object. It would also involve accommodating the retention requirements for the future files as well. As such, this method imposes excessive of overhead requirements and is expensive to maintain.

One approach to addressing this issue is to require decoupling the filesystem retention lock from the cloud storage object locking, such as by locking the objects manually or using bucket-level locking. With respect to locking the objects manually using cloud provider's retention lock APIs, this approach is generally not feasible as administrators must manually lock the files all the time and then also extend the locks before they expire, and so on. With respect to bucket level locking, new objects would be locked down for a certain fixed duration, but after the lock expires, the objects are vulnerable again, even though they are still referenced by numerous files. This technique must also be orchestrated well because new files ingested could reference the segments that are due to expire. Such segments must have their lock extended or they will leave the files that they are part of vulnerable to modification/deletion.

Another approach is to apply extend retention locks for live data after garbage collection, but before the locks expire. For this approach, every new object written is automatically locked during the write itself for a certain duration (x days). The garbage collection (GC) cycles would perform the required copying of partial objects and eventually result in a set of objects ready for deletion (including fully dead objects). Immediately before the locks expire, the file system would extend the locks for the remaining live objects only. This cycle repeats to provide continuous protection without any manual intervention. The disadvantages with this approach is that frequent lock extensions are needed before locks expire (e.g., extending locks on potentially hundreds of millions of objects every time); the GC cycles would not be able to delete the locked objects from the bucket until their locks expire, so such objects will occupy the cloud storage for an additional time; and if the filesystem is down, there is no way to extend the locks.

Embodiments of system 100 of FIG. 1 include file immutability process 120 that works with retention locking 122 to achieve data immutability and continuous protection of deduplicated objects from backup process 112 in cloud storage. Such a process may be executed as an application supported by a server (e.g., server 102) or it may be a network 110 or cloud-based application.

FIG. 5 illustrates a backup system 500 including a file immutability process 522, under some embodiments. In an embodiment, this process is embodied as a hardware component or module within the data manager 501, although it may be embodied as a separate component or even a cloud-based module in other embodiments. It should be understood that the example of FIG. 5 is non-limiting, as methods described herein can be performed in different architectures and systems. In system 500, data manager 501 manages backup of data 507 for a host device 508, which can be any networked computing device with data that requires backup. The data is packed in one or more data objects 506 that are stored in cloud storage 502 managed on the cloud by cloud provider 520 which can reside on the network 504.

In an embodiment, the data manager 501 runs a backup application 514 that provides deduplication processes to reduce storage of redundant data. The backup application can include general backup functionality such as one or more deduplication algorithms that reduce storage or redundant data, or splitting chunks into multiple objects in case of non-dedupe backups, and other functionality, as described above. The backup application 514 also includes logic, algorithms, and other instructions, that can be executed by the garbage collector 515 and deletion and lock extension threads 516.

The garbage collector 515 can be a cloud-based garbage collector, or it can be integrated as part of the data manager (as shown), or even run on a separate networked computing device. The garbage collector can be scheduled (e.g., by an administrator) to periodically iterate through the data objects 506 that are stored in storage 502 to mark the objects for object extension or for deletion. The garbage collector can refer to metadata 518 which can include information about each of the data objects 506 that are kept in storage. Based on this metadata processing, the garbage collector can determine the status of each of the data objects, e.g., which objects contain live segments, a mix of live and dead segments, or only dead segments. For a GC operation, only fragmented objects, i.e., those containing mix of live and dead segments will be carry forwarded, so that the new objects created contain only live segments.

The data manager 501 can operate in a multi-threaded environment. Thus, the data manager can have one or more deletion threads that are dedicated to performing deletion of objects marked for deletion, and one or more lock extension threads that extend the locks for objects marked for extension. The number of threads can vary based on application.

An attacker (e.g., a hacker) 512 or some other unwanted entity can attempt to delete, modify or move the data as it is stored, such as by improperly obtaining the cloud credentials from a user computer 513. To defeat these efforts, the garbage collector can periodically lock the data objects in compliance mode, and these locks are not removable by the attacker or anyone else but the security officer.

Each data object 506 can have a respective lock 505 with an expiration (which can include a time, date and/or time duration). The locks can be supported by the cloud provider 520. The cloud provider can include one or more APIs 221, such as lock APIs, from which the locks 505 can be controlled (e.g., created and extended). The expiration of each lock can be set so that they each lock expires at the same time for each object. When the garbage collector 515 runs, it can calculate the next lock extension date/time (e.g., based on the scheduled intervals of the garbage collector) for both newly moved objects and the objects marked for extension by current garbage collection run. This would ensure that all objects expire at the same time within an interval, ensuring consistent results.

Lock to Future Date

As stated above, one method of protecting deduplicated objects is to use some form of lock extension 516. However, this approach may require an excessive number of extensions and still lead to data mutability, and hence data vulnerability. In an embodiment, the file immutability process 522 implements a lock to future date process in which every new cloud-based data object 506 will be locked down for a period of time to a fixed future date, known as a 'protection duration.'

Figure 6:
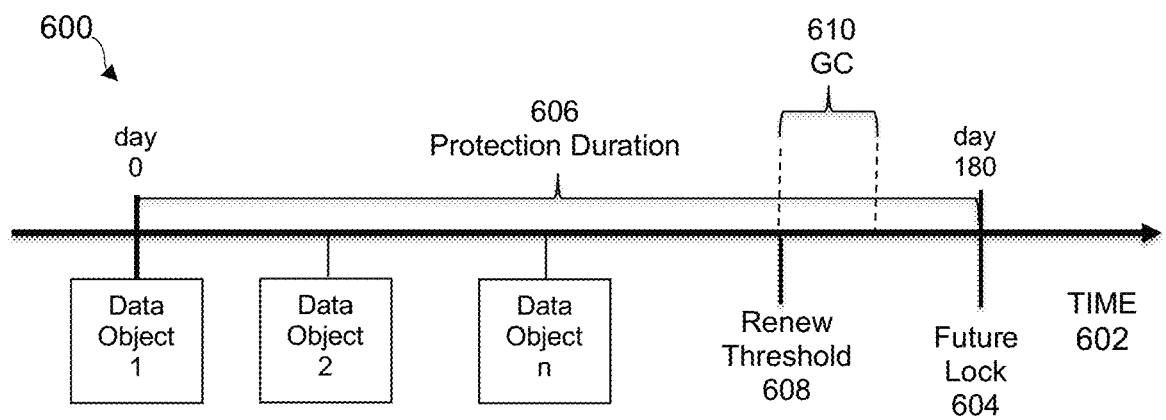
FIG. 6 illustrates lock to future date method of providing file immutability to cloud-based data objects, under some embodiments.

FIG. 6 illustrates lock to future date method of providing file immutability to cloud-based data objects, under some embodiments. As shown in FIG. 6, diagram 600 includes a timeline 602. A number (n) of data objects are written during a time period on this time line, such as denoted Data Objects 1, 2, . . . , n. A future lock date 604 is defined from the date of writing a first data object (e.g., Data Object 1). This defines day 0 of the protection duration 606. All data objects written after this first data object are protected only for the remainder of the protection duration up to the future lock date 604. Thus, for example, if data object 1 is written today, it will be locked and protected for 180 days from now, assuming a protection duration of 180 days. Any data objects written tomorrow will be locked for 179 days, and so on, so that the protection duration shortens for data written after the first data object. For example, at the end of $100^{th}$ day, all the objects will still be locked for the remaining 80 days.

In this embodiment, the future lock date single static date based on a set start date or date of writing a first data object, it is not a moving date that provides the same protection for data objects written after the start date. Thus, in the example of FIG. 6, the future lock provides a set date, and not necessarily 180 days of protection from the time of creation of each object. Although the example of FIG. 6 illustrates protection duration on the order of days along timeline 602, it should be noted that any time granularity may be used, such as hours, weeks, months, and so on, depending on system configuration and protection requirements.

The protection duration 606 can be configured in the deduplication system to be of a length that to enables immutability protection for the cloud data objects. Choosing an optimal value for protection duration depends on factors like ingest rate and GC churn per cycle. For example, if the GC churn is low, a longer protection duration can be used. Generally, the ingest rate also increases linearly over time.

Figure 7:
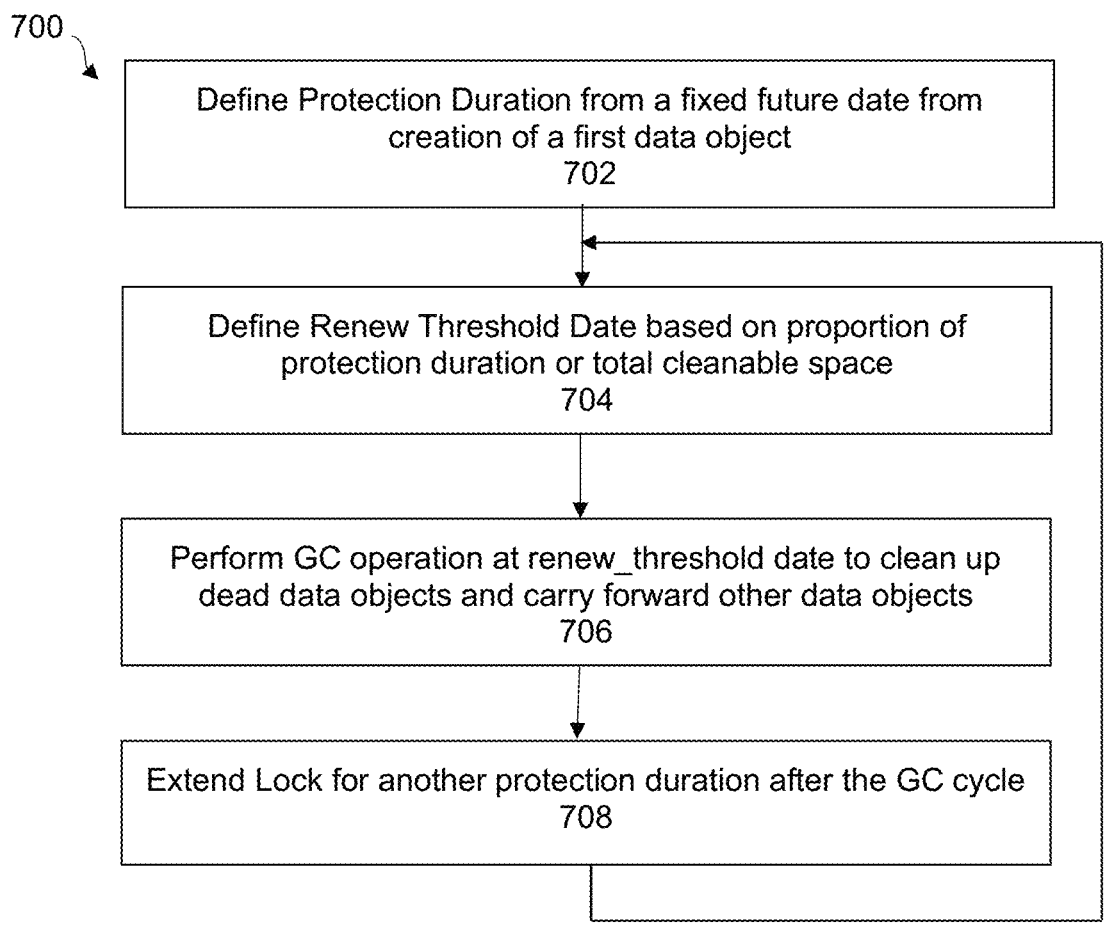
FIG. 7 is a flowchart that illustrates an overall method of providing data immutability using a future lock mechanism, under some embodiments.

FIG. 7 is a flowchart that illustrates an overall method of providing data immutability using a future lock mechanism, under some embodiments. Process 700 of FIG. 7 begins by defining the protection duration 606 as a fixed future lock date 604 from a first date, step 702. Data objects locked within this protection duration are only locked until that future lock date is reached. In an embodiment, data objects will be locked using cloud provider's retention lock APIs 521.

When a new object is written to the cloud bucket using a PUT request, the system will add appropriate headers in the PUT request to ensure objects are locked as part of the write itself. For example, AWS supports certain headers to lock the object in the PUT request itself as in:

x-amz-object-lock-mode x-amz-object-lock-retain-until-date

No additional locking operation is required for each object. The locking specify a 'compliance mode' so that locks cannot be reverted from the cloud provider side, and all objects will be locked down until the same date 604 regardless of when they were created within the protection duration period 606.

In an embodiment a controlled garbage collection process 515 is run on the deduplication filesystem. The GC cycle is selected to balance minimal processing overhead and liberation of system storage. For example, infrequent GC cycles can cause additional storage objects (dead objects) to remain in the system thus incurring additional storage costs. For a weekly GC cycle, if the average churn is 10 TB in each cycle, 80 TB will get accumulated in two months. In this case, the GC cycle can be shortened so that dead objects are removed more frequently.

For this embodiment, since the objects are locked to a date, there is little or no need for any lock extension cycles to be triggered.

Diagram 600 also includes a renew threshold 608, which is a date at which a GC cycle 610 will be triggered to perform a garbage collection operation. This renewal threshold date 606 is defined within the protection duration 606 and is selected based on a percentage of the protection duration, or an amount of total cleanable space, step 704. For example, the renew_threshold date value can be set to 80% of the protection duration, or it can also be when total cleanable space crosses 70% of the filesystem capacity. These values are provided for example only, and any other value for either measure can be used. In this case, cleanable space refers to the amount of space that a GC operation can cleanup, and comprises of the space utilized by dead objects and partially fragmented objects.

For this embodiment, the garbage collection operation that is triggered at the renew_threshold date will clean up dead objects from the filesystem and copy forward other data objects, as appropriate, step 706. The cloud object store will retain and charge for the dead objects until the expiry time defined by the future lock date 604.

In an embodiment, at the end of the GC cycle 610, the retention lock will be extended for another protection duration, step 708. The lock extender process 516 will run at the end of the GC cycle and for all of the remaining live objects, it will lock those for the next protection duration (e.g., another 180 days), along with any new data objects written or created during this next protection duration period.

In an embodiment, the next protection duration may be selected to be the same as the previous protection duration by default. Alternatively, it can be set to a different duration based on different or updated factors.

As shown in FIG. 7, the successive extension of locks by creating subsequent protection periods is performed in an iterative manner as long as new data objects are written to cloud storage and/or live data objects are written forward by a GC operation.

The future lock date approach may have some associated costs, such as additional storage costs for the deleted data in the deduplication system's cloud bucket, for which charges will be incurred until their locks expire. However, this cost is offset by the fact that garbage collection operations are not run very frequently (i.e., not at usual weekly cycle). There is also fewer lock extensions triggered. For example, for a period of 6 months, with a weekly GC schedule and a 21 day protection duration, there will be 24 GC operations and around eight lock extension cycles in some systems. Each lock extension for 60 million objects can exceed $400 (in today's rates). Each GC cycle also deletes the dead containers and copy forwards the live segments from almost dead containers. Since there is no GC in the present embodiment, the IOPs cost associated with GC is also saved.

Embodiments generally reduce the number of lock extensions and GC cycles, thus saving many CPU cycles and money associated with the IOPs for lock extension. This cost savings can leverage a lower type of instance in the cloud. Alternatively, the extra cycles that re freed up can be consumed by other work in the deduplication system, such as faster data ingest and restores or replication.

As stated above, previous solutions suffered from the fact that if the filesystem is down, there is no one to extend the locks. This exposes the data in a way that can lead to a potential data loss. Under the embodiment of FIG. 7, the lock extensions are not very frequent (e.g., on the order of 180 days). This long time period gives ample opportunity to monitor the system and generate alerts if the filesystem is down during this time, thus allowing remedial measures to be taken.

The future lock embodiment utilizes the cloud provider's compliance locking mode feature intelligently to create a logical protection layer around the deduplicated cloud objects, which provides the strongest mode of locking that cannot be removed by anyone until they expire.

This embodiment prevents all types of attackers including the ones having access to the deduplication system or cloud storage administrator credentials from deleting the cloud objects by any means. It also requires much reduced lock extension cycling and much reduced GC churn. It has the potential to free lots of CPU cycles for other processes in the deduplication system, and it prevents a great deal of cloud cost that could have been incurred due to GC and lock extensions. Finally, it secures all the objects in the cloud without requiring any manual locking.

Lock and Expire

In a first alternative embodiment, every new cloud object will be locked down for a certain period of time to a fixed future date, and instead of running any garbage collection cycle, the system will spawn a new filesystem and replicate all data to the new system.

Figure 8:
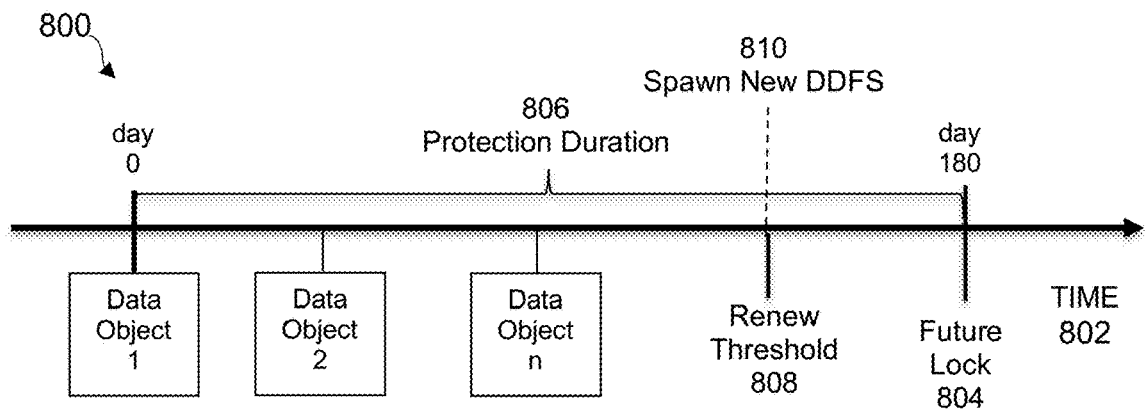
FIG. 8 illustrates a lock and expire method of providing file immutability to cloud-based data objects, under some embodiments.

FIG. 8 illustrates a lock and expire method of providing file immutability to cloud-based data objects, under some embodiments. As shown in FIG. 8, diagram 800 includes a timeline 802. A number (n) of data objects are written during a time period on this time line, such as denoted Data Objects 1, 2, . . . , n. A future lock date 804 is defined from the date of writing a first data object (e.g., Data Object 1). This defines day 0 of the protection duration 806. All data objects written after this first data object are protected only for the remainder of the protection duration up to the future lock date 804. Thus, for example, if data object 1 is written today, it will be locked and protected for 180 days from now, assuming a protection duration of 180 days. Any data objects written tomorrow will be locked for 179 days, and so on, so that the protection duration shortens for data written after the first data object. For example, at the end of $100^{th}$ day, all the objects will still be locked for the remaining 80 days.

In this embodiment, the future lock date single static date based on a set start date or date of writing a first data object, it is not a moving date that provides the same protection for data objects written after the start date. Thus, in the example of FIG. 8, the future lock provides a set date, and not necessarily 180 days of protection from the time of creation of each object. Although the example of FIG. 8 illustrates protection duration on the order of days along timeline 802, it should be noted that any time granularity may be used, such as hours, weeks, months, and so on, depending on system configuration and protection requirements.

The protection duration 806 can be configured in the deduplication system to be of a length that enables immutability protection for the cloud data objects. Choosing an optimal value for protection duration depends on factors like ingest rate and GC churn per cycle. For example, if the GC churn is low, a longer protection duration can be used. Generally, the ingest rate also increases linearly over time.

Figure 9:
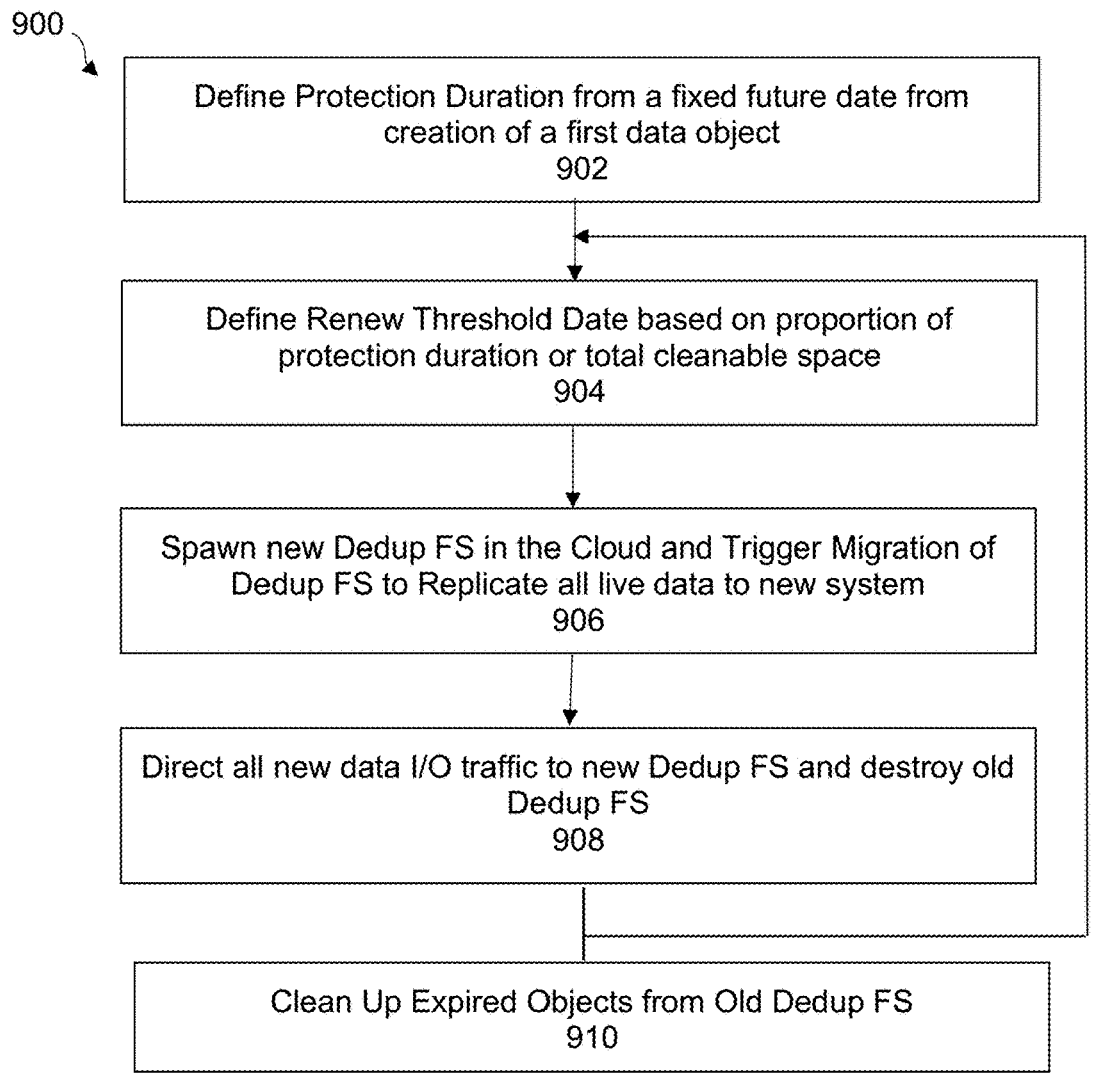
FIG. 9 is a flowchart that illustrates an overall method of providing data immutability using a lock and expire mechanism, under some embodiments.

FIG. 9 is a flowchart that illustrates an overall method of providing data immutability using a lock and expire mechanism, under some embodiments. Process 900 of FIG. 9 begins by defining the protection duration 806 as a fixed future lock date 804 from a first date, step 902. Data objects locked within this protection duration are only locked until that future lock date is reached. In an embodiment, data objects will be locked using cloud provider's retention lock APIs 521.

As stated above, when a new object is written to the cloud bucket using a PUT request, the system will add appropriate headers in the PUT request to ensure objects are locked as part of the write itself. Such headers may correspond to those examples mentioned previously.

No additional locking operation is required for each object. The locking specify a 'compliance mode' so that locks cannot be reverted from the cloud provider side, and all objects will be locked down until the same date 804 regardless of when they were created within the protection duration period 806.

Diagram 800 also includes a renew threshold 808, which is a date at which the system will spawn a new deduplication filesystem in the cloud, 810. This renewal threshold date 806 is defined within the protection duration 806 and is selected based on a percentage of the protection duration, or an amount of total cleanable space, step 904. For example, the renew_threshold date value can be set to 80% of the protection duration, or it can also be when total cleanable space crosses 70% of the filesystem capacity. These values are provided for example only, and any other value for either measure can be used. In this case, cleanable space refers to the amount of space that a GC operation can cleanup, and comprises of the space utilized by dead objects and partially fragmented objects.

As shown in step 906 of FIG. 9, method 900 will spawn a new deduplication filesystem in the cloud, and trigger the migration module of the deduplication filesystem to replicate all the live data to the newly spawned system, 906. Generally, deduplication systems (like PowerProtect Data Domain) have the intelligence to replicate only live segments to the destination system. In the new system, the new objects are created as a result of replication will get locked in the same protection duration (e.g., 180 days).

Once all data the data is replicated to the new deduplication filesystem, all new data I/O traffic will be redirected to the new deduplication filesystem, and the old deduplication filesystem and its data will be destroyed, 908. This cycle repeats over the protection duration 806 and thereby provides complete protection to all deduplicated objects in the cloud.

Redirection of new data I/O traffic can be done by deduplication systems using certain scale-out architectures, where applications need not know in which deduplication system the data resides. The data migration to the new deduplication system would be transparent to the application in this case. One such example is the Data Domain Scale Out architecture. The Smart Scale architecture pools together a set of DD Restorers (DDRs) into a group under the data center wherein all DDRs are managed by DDMC for space balancing. The actual placement of the backup object is in one of the DDRs in the System Pool which is done by Smart Scale services. Smart Scale provides a federated system deployment model that can be applied to new or existing data center protection infrastructure deployments. Similarly, as with any protection environment, the customer's backup software and its associated clients are deployed and linked to DD series by means of their protection policies. Data Center is the place where one or more DDRs are grouped together. The Smart Scale service VM (also called the DD Namespace VM) can be deployed directly from the DDMC UI. When the Smart Scale service VM is deployed, a system pool can be created, which is a grouping of DDRs from the list of DDRs in the data center. Other similar scale out architecture solutions can also be used.

For systems without the capability of such a transparent scale-out architecture, the process might require certain additional manual steps to complete the migration. Additional steps can include automated processes to make the clients aware of the new deduplication filesystem or performing manual modifications in the clients to point to the new deduplication filesystem.

Once the new deduplication filesystem is operational and starts accepting all I/O traffic, the old filesystem can be decommissioned and all the data in the bucket can be deleted, 908. These deleted data objects, however, are still locked, and many cloud providers fail delete operations on locked data. Some providers (like AWS) that use versioning, may allow the deletion to happen, but protect the real object version until the lock expiry. In any case, the deleted data objects will incur storage costs until their locks expire and they are cleaned up by a GC operation. Cleaning up of all stale/expired objects can be done manually later or automatically by configuring object lifecycle policies with the cloud provider, 910.

Under this embodiment, certain costs may be incurred, such as a replication or data migration cost. For example, for a fully filled 256 TB filesystem, this would mean writing around 60 million objects (4.5 MB each), which would be around $300 (at a rate of $0.005 per 1000 PUT requests). This cost will be incurred whenever a new deduplication filesystem is spawned, i.e., towards the end of each protection duration cycle (for example, once in 180 days). There can also be additional storage costs for the data in the old deduplication filesystem's cloud bucket, which will be charged for until their locks expire. While these are additional costs that are incurred in this model for providing data immutability/continuous protection, there are significant cost savings by not running the usual periodic GC operations (e.g., weekly cycles), and in not extending any locks at all. In an example six-month period, with a weekly GC schedule and 21 day protection duration, this means that there will be 24 GC runs and around 8 lock extension cycles, such as in the embodiment described above. Each lock extension for 60 million objects may cost on the order of $400. Each GC cycle also deletes the dead containers and copy forwards the live segments from almost dead containers. In this embodiment, since there is no GC, the IOPs cost associated with GC is saved.

With no lock extension and no GC, this first alternative embodiment could save a significant number of CPU cycles, which can reduce the cost of the solution by leveraging a lower type of instance in the cloud. Alternatively, the extra cycles freed can be consumed by other resources in the deduplication system, such as to provide faster ingest/restores or replication.

Under the lock and expire embodiment, the method utilizes the cloud provider's compliance locking mode feature intelligently to create a logical protection layer around the deduplicated cloud objects. This method prevents all types of attackers including the ones having access to the deduplication system as well as cloud storage administrator credentials from deleting the cloud objects by any means. This method does not require any lock extension cycle and prevents GC from executing for the whole of protection duration, and secures all data objects in the cloud without requiring any manual locking. It has the potential to free many CPU cycles for other processes in the deduplication system, and it prevents a great deal of cloud cost that could have been incurred due to GC and lock extensions.

Selection Duration

In a second alternative embodiment, the deduplication system can be configured to protect for a certain 'protection duration,' a certain set of files and their underlying objects ingested over a certain period known as 'selection duration.' This would protect the namespace as well as the underlying deduplicated objects in a bucket, and can also be configured whether to protect all files ingested in the period or only certain files locked in that period.

Figure 10:
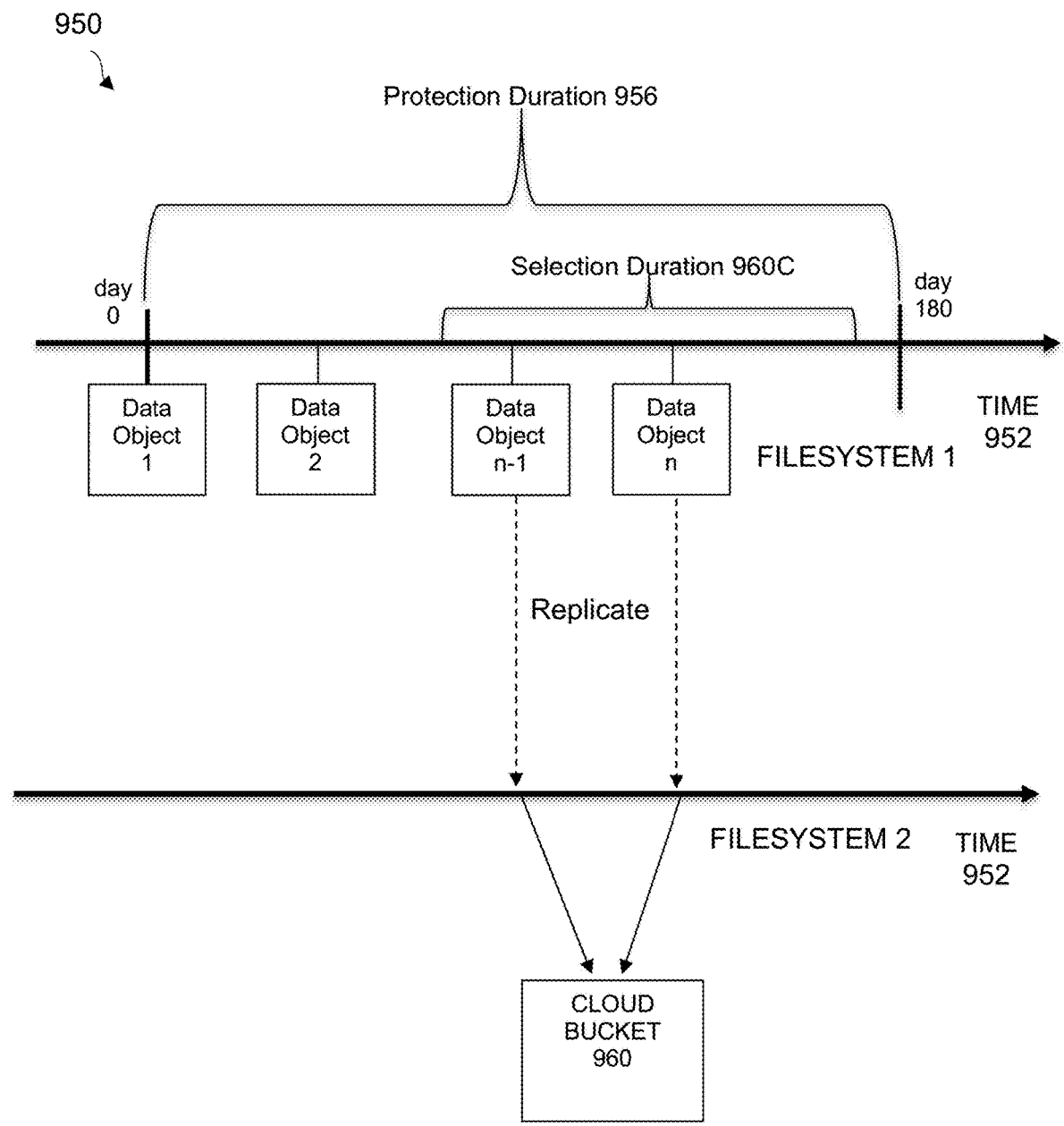
FIG. 10 illustrates a selection duration method of providing file immutability to cloud-based data objects, under some embodiments.

FIG. 10 illustrates a selection duration method of providing file immutability to cloud-based data objects, under some embodiments. As shown in FIG. 10, diagram 950 includes a timeline 952 for a first filesystem, Filesystem1. A number (n) of data objects are written during a time period on this time line, such as denoted Data Objects 1, 2, . . . , n−1, n. A future lock date 954 is defined from the date of writing a first data object (e.g., Data Object 1). A subset of files (e.g., Data object n−1, n) are selected and replicated to a new filesystem, Filesystem2, which also has the timeline 952. These objects of the replicated subset are then moved to the cloud bucket 960, where they get locked for the protection duration (e.g., 180 days).

Figure 11:
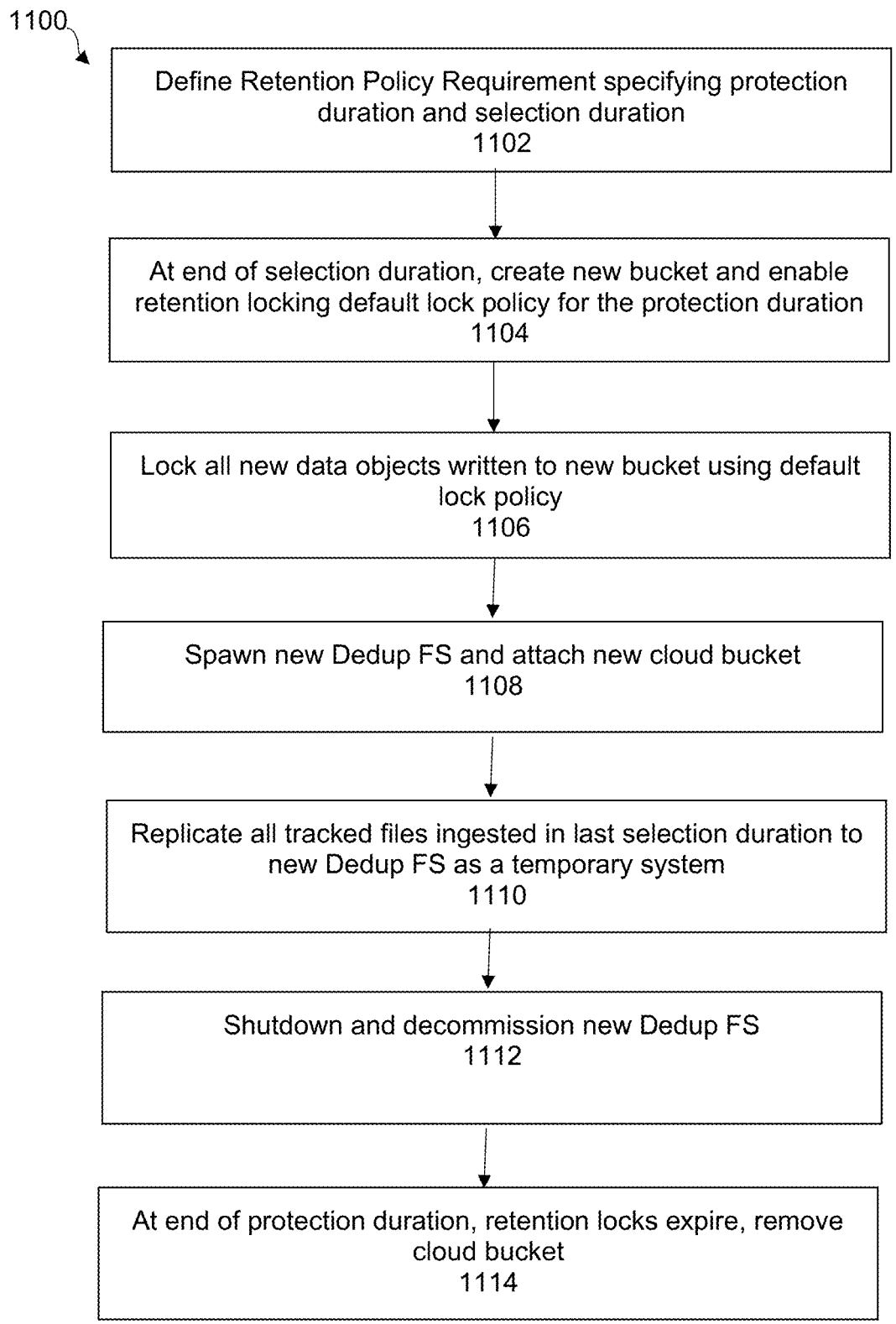
FIG. 11 is a flowchart that illustrates an overall method of providing data immutability using a selection duration mechanism, under some embodiments.

FIG. 11 is a flowchart that illustrates an overall method of providing data immutability using a selection duration mechanism, under some embodiments. Process 1100 of FIG. 11 begins by defining a retention policy requirement that specifies the protection duration 956 and the selection duration 960 for certain types of data, step 1102. For example, the retention policy requirements may be expressed as: "Protect the set of all files ingested in the last one week for a period 180 days". In this example, the protection duration is 180 days and the selection duration is 1 week. Such periods are provided for purposes of example only, and any other respective time periods may be used.

For this embodiment, the type of file to be protected comprises files ingested in a certain period of time, e.g., 1 week, and is thus a time-based selection. Alternatively, other characteristics can be used to select the files, such as file types, file tags, file sources/directories, storage destinations, and so on. These characteristics can be independent of time (e.g., all MS-Word docs or files tagged "privileged") or they may be time-based as well (e.g., only spreadsheet files ingested in one week).

In an embodiment of the time-based case, the selection duration is repeated, and at the end of first selection duration (e.g., at end of 1st week), the process 1100 creates a new cloud bucket and enables object retention locking in this bucket, and it also enables default lock policy on the bucket for the protection duration (180 days in this example), step 1104. All new data objects written to this new bucket will get locked using compliance mode locking for the protection duration (e.g., 180 days), 1106.

In an embodiment, the naming scheme of the new bucket or buckets conforms to a format that provides adequate descriptive information, such as date/time, directory name, Mtree name, filesystem name, and so on, which are required to identify it later during a restore or recovery operation. The system will then spawn a new deduplication filesystem and attach to it the new cloud bucket, 1108. It will then replicate all the tracked files that were ingested in the last selection duration to this new deduplication filesystem, 1110. The system can simply enumerate the filesystem to get the inodes modified over the last selection duration 960. It can also achieve this by using snapshot differencing. It can also be configured to choose only files locked in the last selection duration.

Once the replication is complete, the new system will move all the data to the cloud bucket, 1110. The new filesystem will then be shut down and decommissioned, 1112. Since the old system continues getting more data, the new filesystem is a temporary system, and once a selected set of data is replicated to the new system, the new system moves the data to cloud bucket and its job is done, so it is no longer required. At this point, there is a cloud bucket containing deduplicated objects and the namespace for that selection duration, 960. At a later stage, when there is a need for recover/restore the files from this previous image, a new filesystem will be spawned and attached to the cloud bucket, and the recovery operation associated with the bucket will be performed to access the files.

Once the protection duration is completed for a bucket (180 days in the example), the object locks would have expired, so the cloud bucket can then be safely removed, 1114. The selection duration and the protection duration define the flexibility of this method. This method allows for very fine-grained snapshots or selection of files.

In an embodiment, process 1100 can also be configured to group data according to a defined policy. For example, only files locked in last x (e.g., 2) days, all files ingested and modified in the whole week or last y (e.g., 2) weeks. Whole subsets of the filesystem can be backed up every certain number of days (e.g., 3) irrespective of whether one or more files are locked or not, or even one or more directories backed up every day, every week, or every month etc. Likewise, the whole file system may be backed up every week, or other period of time. Any practical time-based and/or non-time based grouping may be used The details of the cloud buckets created would be persistently maintained by the first filesystem all the time so that it can be referred to during a recovery process. Recycling of buckets would happen when the retention duration expires. For example, if retention policy says objects need to be protected for 180 days, then after 180 days, the older buckets would be deleted (as the locks would have expired on all the objects). This can be performed by the file immutability process 522.

Under this embodiment, lock extension is relative to the protection duration 956. Even though deduplication factor will be reduced, this method allows for flexible selection of files and the objects that must be locked. This method protects the filesystem namespace as well as the underlying cloud objects, which would help greatly in perform a disaster recovery process for the full filesystem or selectively for one or more files. This method is applicable to protect all locked files as well as any file irrespective of the lock state.

System Implementation

Embodiments of the processes and techniques described above can be implemented on any appropriate backup system operating environment or filesystem, or network server system. Such embodiments may include other or alternative data structures or definitions as needed or appropriate.

Figure 12:
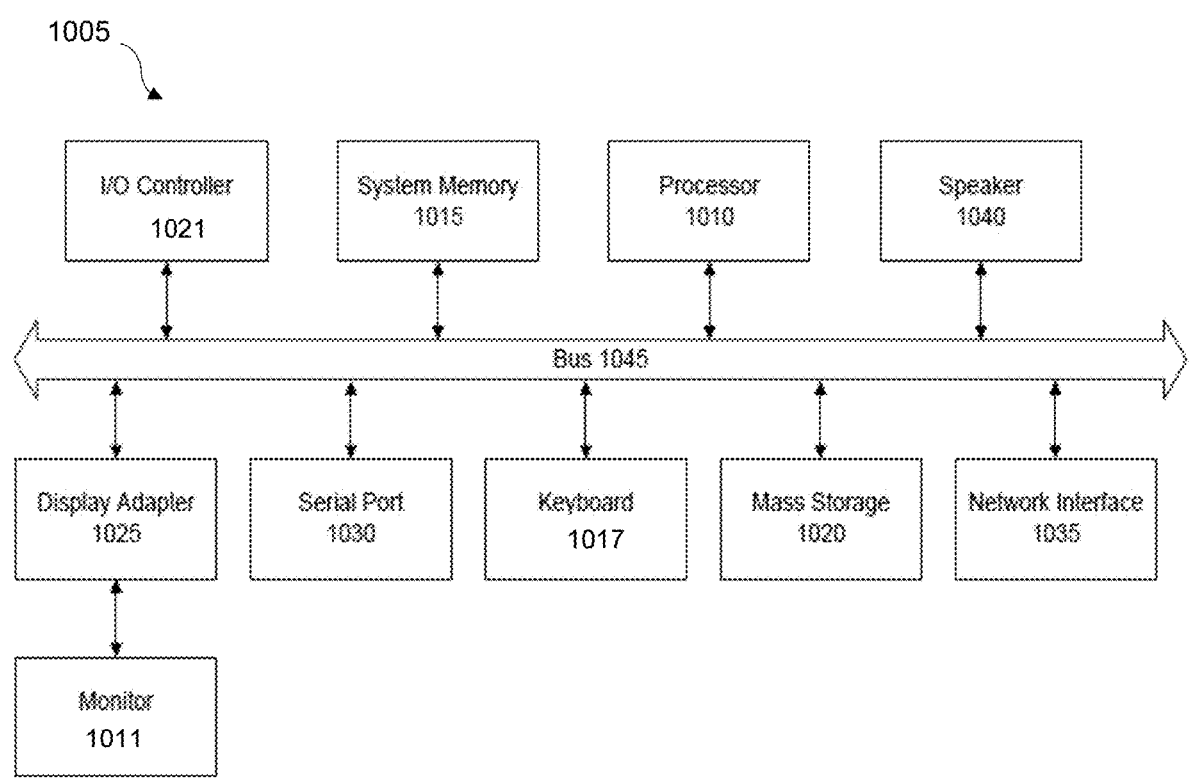
FIG. 12 is a system block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated "with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method, comprising:
defining a protection duration from a first date to a fixed future date;
applying a retention lock to one or more data objects stored in a first filesystem in cloud storage during the protection duration, the retention lock preventing deletion, modification or movement of the data objects by an unauthorized entity;
defining a renew threshold date within the protection duration;
spawning, on the renew threshold date, a new filesystem in the cloud storage;
writing a data object to the cloud through a cloud bucket using a PUT request;
adding appropriate headers in the PUT request to ensure objects are locked as part of a write operation of the data object itself;
redirecting all new data objects to the new filesystem, wherein the new data objects are locked for the protection duration; and
destroying the first filesystem.

2. The method of claim 1 further comprising:
cleaning up expired objects from the first filesystem; and
spawning additional filesystems repeatedly during the protection duration to provide complete protection to all data objects in the cloud storage.

3. The method of claim 1 wherein the protection duration is selected based on a data ingest rate and an amount of data turned over by a garbage collection cycle, and further wherein the retention lock is a compliance retention lock.

4. The method of claim 1 wherein the redirecting step is performed using an operating system scale-out architecture that a manages storage resources for space balancing.

5. The method of claim 1 wherein the redirecting step is performed by one of: using automated processes to make clients aware of the new filesystem, or using manual modifications in the clients to point to the new filesystem.

6. The method of claim 1 wherein the first date corresponds to a date that a first data object is written to the cloud storage, and wherein the renew threshold date is selected based on one of: a proportion of the protection duration, or a total cleanable space.

7. The method of claim 1 wherein the cloud storage comprises part of a deduplication backup system including a process executed by a data storage server running a deduplication filesystem.

8. The method of claim 7 wherein each of the first and new filesystems are deduplication filesystems.

9. A computer-implemented method, comprising:
defining a repeatable retention lock period recurring from a fixed date, with each retention lock period having a fixed end date;
applying a retention lock to one or more data objects stored in a first filesystem in cloud storage during each retention lock period, wherein the retention lock protects data objects written any time during a respective retention lock period only up to the corresponding fixed end date;
defining a renew threshold date for each retention lock period within the protection duration;
spawning, on each renew threshold date, a new filesystem in the cloud storage;
writing a data object to the cloud through a cloud bucket using a PUT request;
adding appropriate headers in the PUT request to ensure objects are locked as part of a write operation of the data object itself;
redirecting all new data objects to the corresponding new filesystem, wherein the new data objects are locked for the protection duration; and
destroying the first filesystem.

10. The method of claim 9 wherein the redirecting step is performed using an operating system scale-out architecture that a manages storage resources for space balancing.

11. The method of claim 9 wherein the redirecting step is performed by one of: using automated processes to make clients aware of the new filesystem, or using manual modifications in the clients to point to the new filesystem.

12. The method of claim 9 wherein the retention lock preventing deletion, modification or movement of the data objects by an unauthorized entity.

13. The method of claim 12 wherein the repeatable retention lock period is recurred as long as new data objects are written to cloud storage, or live data objects are carried forward by a garbage collection operation, and wherein the renew threshold date is selected based on one of: a proportion of the retention lock period, or a total cleanable space.

14. The method of claim 13 wherein the retention lock period is selected based on a data ingest rate and an amount of data turned over by each garbage collection cycle, and wherein the retention lock is a compliance retention lock.

15. The method of claim 9 wherein the cloud storage comprises part of a deduplication backup system including a process executed by a data storage server running a deduplication filesystem, and wherein each of the first and new filesystems are deduplication filesystems.

* * * * *